United States Patent [19]

Drawbaugh

[11] Patent Number: 5,123,557
[45] Date of Patent: Jun. 23, 1992

[54] GAS STOPPER AND METHODS OF CONSTRUCTING AND UTILIZING SAME

[76] Inventor: Don R. Drawbaugh, 100 E. Hwy. 9, Wetumka, Okla. 74883

[21] Appl. No.: 733,331

[22] Filed: Jul. 22, 1991

[51] Int. Cl.⁵ .............................................. B65D 51/16
[52] U.S. Cl. ................................... 220/203; 220/86.2; 220/239; 220/240; 141/312; 141/369; 141/375
[58] Field of Search ..................... 220/85 F, 86.2, 203, 220/DIG. 33, 239, 240, 746; 141/312, 369, 375

[56] References Cited

U.S. PATENT DOCUMENTS

| | | |
|---|---|---|
| 4,341,322 | 7/1982 | Heinke .................... 220/DIG. 33 X |
| 4,716,920 | 1/1988 | Crute . |
| 4,768,677 | 9/1988 | Kitsukawa . |
| 4,784,423 | 11/1988 | Pardy . |
| 4,787,529 | 11/1988 | Harris . |
| 4,811,763 | 3/1989 | Kupske ........................ 220/85 F X |
| 4,830,067 | 5/1989 | Foutch . |

Primary Examiner—Stephen Marcus
Assistant Examiner—Paul A. Schwarz
Attorney, Agent, or Firm—Irving M. Weiner; Robert M. Petrik; Joseph P. Carrier

[57] ABSTRACT

A gas cap permanently mounted to an access door for preventing back flow of fuel from a filler neck. A tubular member is secured to the access door including a mating member for connecting with the filler neck and locking members. Upon the presence of pressure caused by a fuel backflow, the locking members are engaged to the filler neck preventing the gas cap from being removed. Thus, release of fuel in vehicle accidents, such as rollovers, is prevented.

12 Claims, 2 Drawing Sheets

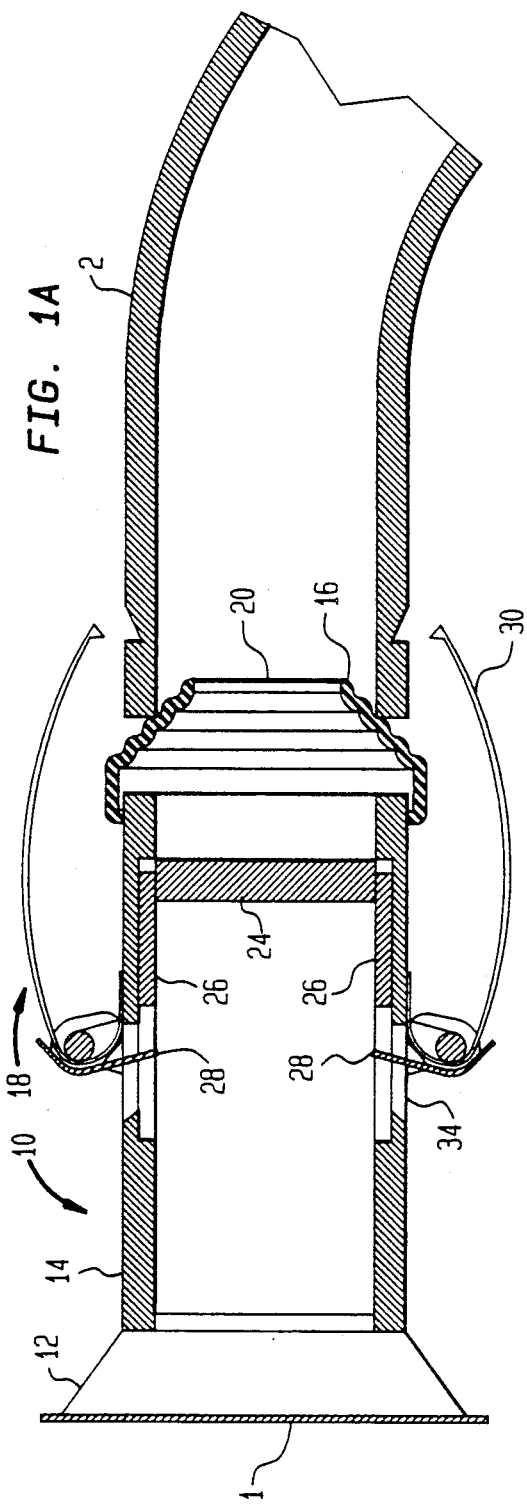
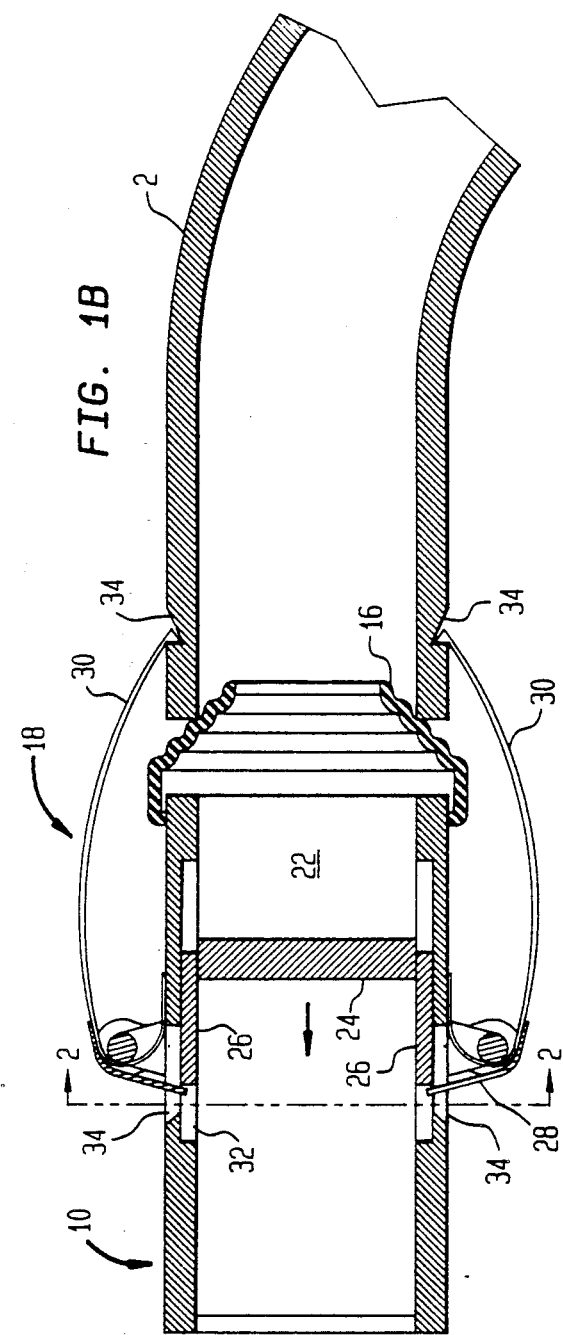
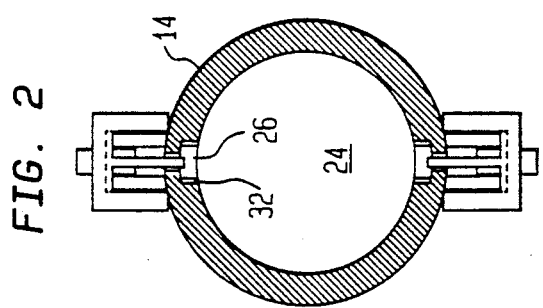

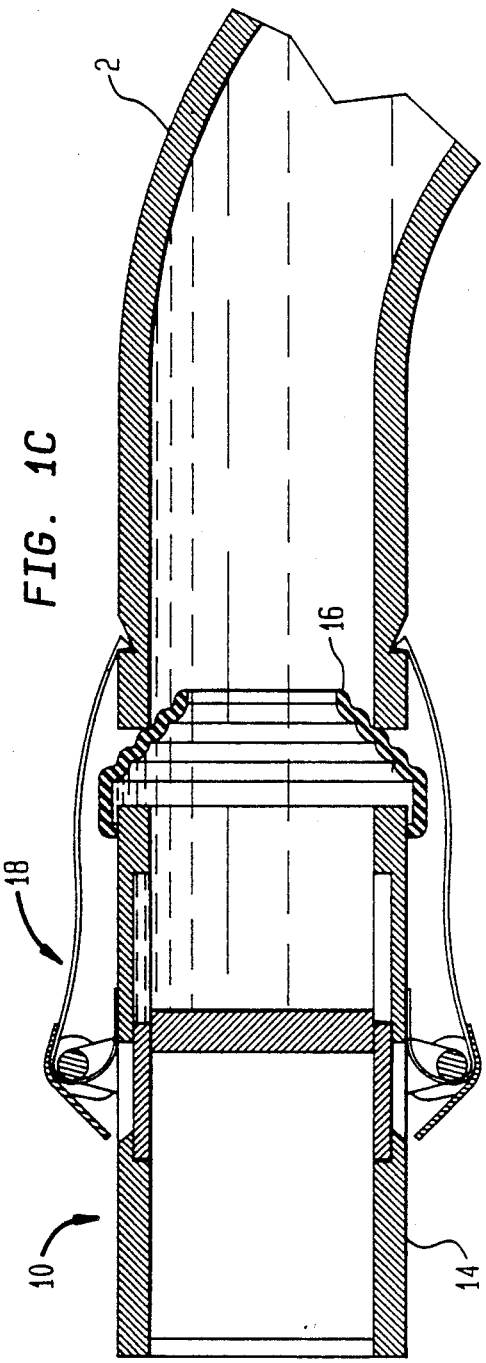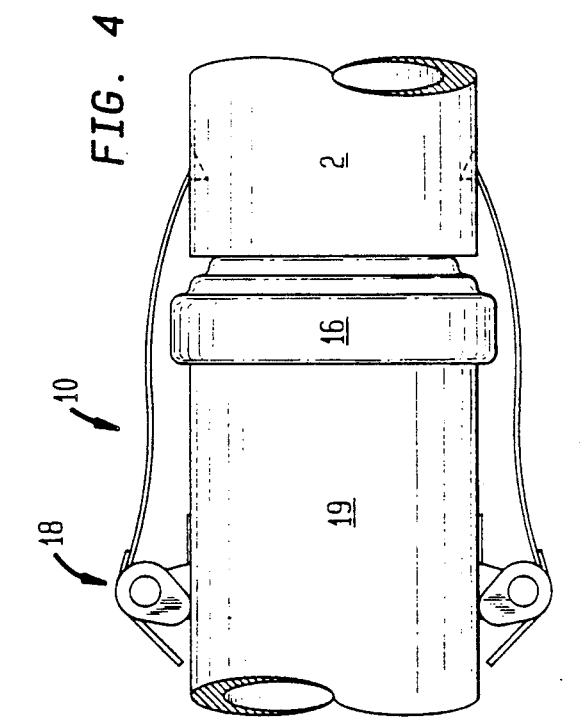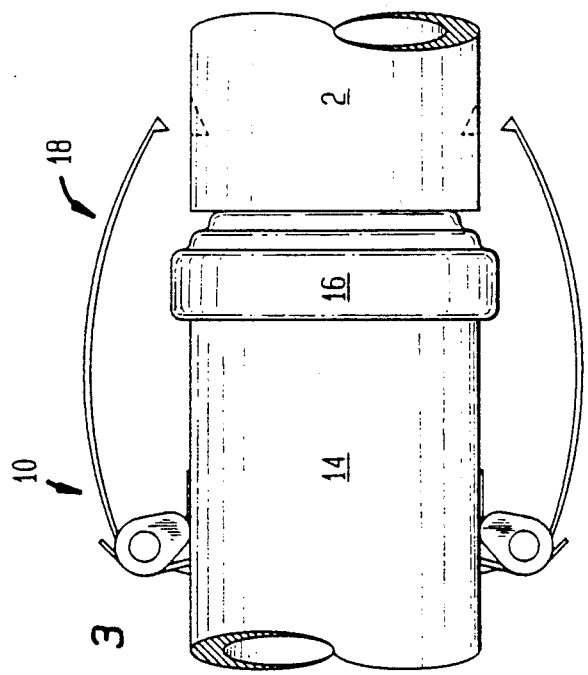

5,123,557

GAS STOPPER AND METHODS OF CONSTRUCTING AND UTILIZING SAME

BACKGROUND OF THE INVENTION

1. Field of the Invention

The present invention relates to a fuel tank cap adapted to prevent the back flow of fuel in a collision of "roll-over" of the vehicle. More particularly, the invention relates to a tubular-shaped tank cap which is securable to the gas door or cover for the opening for the fuel tank filler neck. This tank cap encloses a safety chamber preventing "back flow" when the cap is in place.

2. Description of the Relevant Art

A number of devices have been developed to control the release of fuel which may result from a vehicular accident. These prior fuel caps generally include a roll-over safety valve which operates on pressure-vacuum conditions.

U.S. Pat. No. 4,830,067 discloses a guard to prevent splashing of fuel while refilling a fuel tank. The guard comprises a flexible baffle attachable to a fuel neck cover which permits a gas nozzle to pass through an opening. However, the guard would not prevent release of fuel in a "roll-over" accident.

U.S. Pat. No. 4,784,423 discloses a filler cap including an outer door which matches the contour and color of the vehicle. In use, the cap and outer door are removed during refilling.

U.S. Pat. No. 4,716,920 discloses a fuel cap having a roll-over safety valve which closes upon inverted orcentation of the valve preventing fuel release.

U.S. Pat. No. 4,787,529 discloses a fuel cap utilizing liquid and vapor in filler neck to exert closing force on the pressure relief valve to prevent inadvertent release of fuel.

U.S. Pat. No. 4,768,677 discloses a fuel cap with a top portion adapted to release from a "stopper" portion situated within the filler neck to prevent release of fuel in an accident.

The present invention provides an improved gas filler neck cap which prevents back flow of fuel in an accident without relying on vapor pressure.

SUMMARY OF THE INVENTION

The present invention provides a permanently secured tubular gas cap which prevents the release of fuel in an accident, particularly a roll-over type accident. The gas cap is secured to the gas tank access door normally provided on the vehicle.

In a preferred embodiment, the tubular gas cap is permanently attached to the hinged gas tank access door. Upon closing of the access door, the tubular cap end mates with the gas tank filler neck. When fuel liquid pressure is applied to a locking mechanism, the tubular gas cap is locked to the filler neck preventing unauthorized release of fuel.

It is an object of the present invention to provide a permanently secured gas cap to prevent loss thereof.

It is a further object of the present invention to provide a gas cap which seals in response to the presence of a "back-flow" of fuel.

A still further object of the invention is to provide an automatic gas cap which is in place upon closure of the gas tank access door.

The above and further objects, details and advantages of the invention will become apparent from the following detailed description, when read in conjunction with the accompanying drawings.

BRIEF DESCRIPTION OF THE DRAWINGS

FIG. 1 illustrates a cross-section view of the tubular gas cap and filler neck in accordance with the present invention.

FIG. 1A illustrates the gas cap of FIG. 1 in the locked position in accordance with the present invention.

FIG. 1B illustrates the gas cap of FIG. 1 in the locked position in response to the presence of the liquid fuel in accordance with the present invention.

FIG. 2 illustrates cross-section taken along line 3—3 of FIG. 1A of the gas cap in accordance with the present invention.

FIG. 3 illustrates a partial perspective view of the gas cap of FIG. 1 in accordance with the present invention.

FIG. 4 illustrates a partial perspective view of the gas cap of FIGS. 1A and 1B in accordance with the present invention.

DETAILED DESCRIPTION OF THE PREFERRED EMBODIMENTS

Referring now to the drawings and more particularly to FIG. 1 thereof, a tubular gas cap 10 in accordance with the present invention is shown. The present invention may suitably comprise consist of or consist essentially of, a mounting adapter 12, a tubular cap member 14, a mating member 16 and locking means 18. These members are shown in FIG. 1 in use with standard, known members including a gas tank access door 1 and filler neck 2. It is well known to provide the filler neck 2 behind an access door 1 such as behind a hinged license plate or a hinged door on a quarter panel of the vehicle.

The tubular gas cap 10 may be secured to the access door 1 by a mounting adapter 12. The adapter 12 is sized to accommodate various makes and models of vehicles. Of course, depending on the style of vehicle, an adapter 12 may not be required.

The gas cap 10 is generally tubular in shape having a first end attachable to an access door 12 or adapter 12 and a second end having a flexible mating member 16 secured thereon. Mating member 16 seals against the inner opening of filler neck 2 upon closure of the access door 1 and, upon opening of the access door 1, the gas cap 10 and mating member 16 pivots away form filler neck 2 to permit access for a gas nozzle (not shown).

Mating member 16 includes an opening 20 therein which permits the passage of liquid fuel to a safety chamber 22 in which is positioned an actuator for the locking means 18. The actuator comprises a seal or wall member 24 mounted on sliding support means 26. Mating member 16 is generally conical with a first smaller end adapted to pass into and seal upon the opening of the filler neck 2, and a second larger end having an opening end mated onto the second end of gas cap 10. Wall member 24 may include a seal means, such as an O-ring (not shown) to prevent leakage of fuel past the wall member.

Wall member 24 defines the safety chamber and is adapted to translate or slide between a first, unlocked position (FIG. 1) and a second, locked position (FIGS. 1A,1B). When pressure is applied to wall member 24, such as when a back flow of fuel is present, the wall member 24 slides to a position where sliding support means 26 contact at least one locking member 30 to prevent movement of the gas cap 10 (and in turn the access door 1) from the filler neck 2.

Sliding support means 26 are provided in at least one channel or track 32 in the inner wall of cap member 14. At one end of each channel 32 is an opening 34 through which a locking actuator 28 extends to contact the sliding support means 26 at a first end thereof. The locking actuator 28 forces at least one locking member 30 to contact a cooperating portion 34 on the outer wall of the filler neck 2. The locking member 30 is spring-loaded to disengage from the cooperating portion 34 upon release of the locking actuator 28.

The ends of the at least one channel 32 act as stop means for preventing the sliding support means from travelling too far. Preferably, locking members 30 are constructed of flexible resilient material which always returns to the "unlocked" position unless back flow pressure is present on wall member 24.

Although there has been described what is at present considered to be preferred embodiments of the invention, it will be understood that various modifications may be made therein, and it is intended to cover in the appended claims all such modifications as fall within the true spirit and scope of the invention.

I claim:

1. A gas cap, adapted to prevent release of fuel in an accident, for a gas tank filler neck adjacent a hinged access door, the gas cap, comprising:
   a tubular member having a first end securable to an access door and a second end;
   said second end including a mating member engageable with the opening of a filler neck when said access door is in a closed position; and
   a safety chamber having a sliding wall member therein such that upon pressure being applied on said sliding wall member, a sliding support means associated therewith contacts a locking means for securing said mating member engaged with a filler neck to prevent the release of fuel.

2. The gas cap of claim 1, wherein:
said first end of the tubular member secured to a mounting said adapter being securable to the access door.

3. The gas cap of claim 1, wherein:
said sliding wall member being supported in a position perpendicular to the tubular member blocking said tubular member held by said sliding support means.

4. The gas cap of claim 3, wherein:
said mating member sealingly engaged with said filler neck opening when said access door is in a closed position, and said mating member pivoted away from said filler neck when said access door is opened to permit access to the filler neck for refueling.

5. The gas cap of claim 4, wherein:
said sliding support means is fitted within at least one channel in the inner wall of said tubular member.

6. The gas cap of claim 5, wherein:
said at least one channel having end portions which define the limits for movement of said wall member.

7. The gas cap of claim 6, wherein:
said mating member being generally conical in shape and having an opening at a first smaller end and a second open end mated onto the second end of said tubular member.

8. The gas cap of claim 7, wherein:
said mating member permitting a backflow of fuel to pass into a safety chamber defined by said sliding wall member, said tubular member and said second end of said mating member.

9. The gas cap of claim 8, wherein:
said sliding wall member and said sliding support means moving to a position to engage an actuator which extends into said tubular member, the actuator engaging said locking means.

10. The gas cap of claim 9, wherein:
said locking means contacts a cooperating member on said filler neck to prevent said mating member from releasing therefrom.

11. The gas cap of claim 10, wherein:
said locking means is normally in an unlocked position and only is in a locked position in response to fuel pressure on said wall member.

12. A gas cap in cooperation with a gas tank filler neck located adjacent a hinged access door and in combination with said access door, said gas cap comprising:
   a tubular member having inner and outer walls, a first end and a second end, said first end securable to said access door and said second end including a mating member adapted to engage the opening of a filler neck when said access door is in a closed position; and
   a safety chamber having a sliding wall member therein such that upon pressure being applied on said sliding wall member, a sliding support means associated therewith contacts a locking means for securing said mating member with a filler neck to prevent the release of fuel in an accident.

* * * * *